US006788903B1

United States Patent
Mayer et al.

(10) Patent No.: US 6,788,903 B1
(45) Date of Patent: Sep. 7, 2004

(54) DYNAMICALLY DETERMINING FIRST-PAGE OUT (FPO) TIME

(75) Inventors: Brian C. Mayer, Nampa, ID (US); Quintin T. Phillips, Boise, ID (US); David M. Payne, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/424,649

(22) Filed: Apr. 26, 2003

(51) Int. Cl.[7] .................................................. G03G 15/00
(52) U.S. Cl. .............................................. 399/9; 399/27
(58) Field of Search ............................. 399/9, 82, 8, 27

(56) References Cited

FOREIGN PATENT DOCUMENTS

JP            9-185292       *   7/1997

* cited by examiner

Primary Examiner—Quana Grainger

(57) ABSTRACT

An image-formation device is disclosed which includes an image-formation mechanism and a controller. The image-formation mechanism is capable of forming images on media. The controller is capable of dynamically determining a first-page out (FPO) time for the image-formation mechanism based on at least changing characteristics of the image-formation mechanism.

25 Claims, 4 Drawing Sheets

DYNAMICALLY DETERMINING FIRST-PAGE OUT (FPO) TIME

BACKGROUND OF THE INVENTION

Since their introduction, printers have become very popular peripherals for computers. One type of printer is the laser printer. In a laser printer, a laser scans an image onto a charged drum, which is coated with toner where the laser printer scanned the image. The image is developed with the toner, and is transferred to the media. A fuser, generally located in the printer, then fuses the toner permanently to the media. Laser printers, as well as other types of printers, are commonly available in both black-and-white models and color models.

There are typically two speed ratings associated with laser printers in particular. The first rating is the number of pages per minute (PPM) the printer can print once it has warmed up. The PPM rating generally depends on the speed with which a printer can decode a provided print job for printing, as well as the speed at which the various components within the printer can operate. The second rating is the first-page out (FPO) time. The FPO rating indicates how long it takes for a printer to complete and eject the first printed page of a print job once the printer has received the print job.

The FPO rating for a laser printer largely depends on the length of time it takes to sufficiently heat the fuser so that it can fuse the toner to the media. If the fuser is not warm enough, then the toner may not properly adhere to the media. The toner may easily rub or flake off the media, or print quality may decrease. A laser printer that is able to quickly output printed media, but which has a large FPO time, may nevertheless be perceived as slow by users.

Therefore, manufacturers of laser printers have attempted to decrease the FPO time as much as possible. However, the FPO time for a given laser printer does not stay constant over time. As the printer ages, for instance, the fusers that permanently affix the applied toner to media may require longer lengths of time to heat up sufficiently to operate properly. Different types of toners may require different temperatures for permanent affixation to media.

If the FPO time for a printer is artificially set too short, the result can be that the toner does not affix permanently to the media. That is, the toner may subsequently rub off the page when touched by the user. Such a laser printer may otherwise be in good operating condition, but users may nevertheless believe that the printer is malfunctioning and in need of service or replacement, due to the inability of the printer to permanently affix toner to the first page of media.

SUMMARY OF THE INVENTION

An image-formation device of an embodiment of the invention includes an image-formation mechanism and a controller. The image-formation mechanism is capable of forming images on media. The controller is capable of dynamically determining a first-page out (FPO) time for the image-formation mechanism based on at least changing characteristics of the image-formation mechanism.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Example Laser Printer and Image-formation Device

Figure 1:
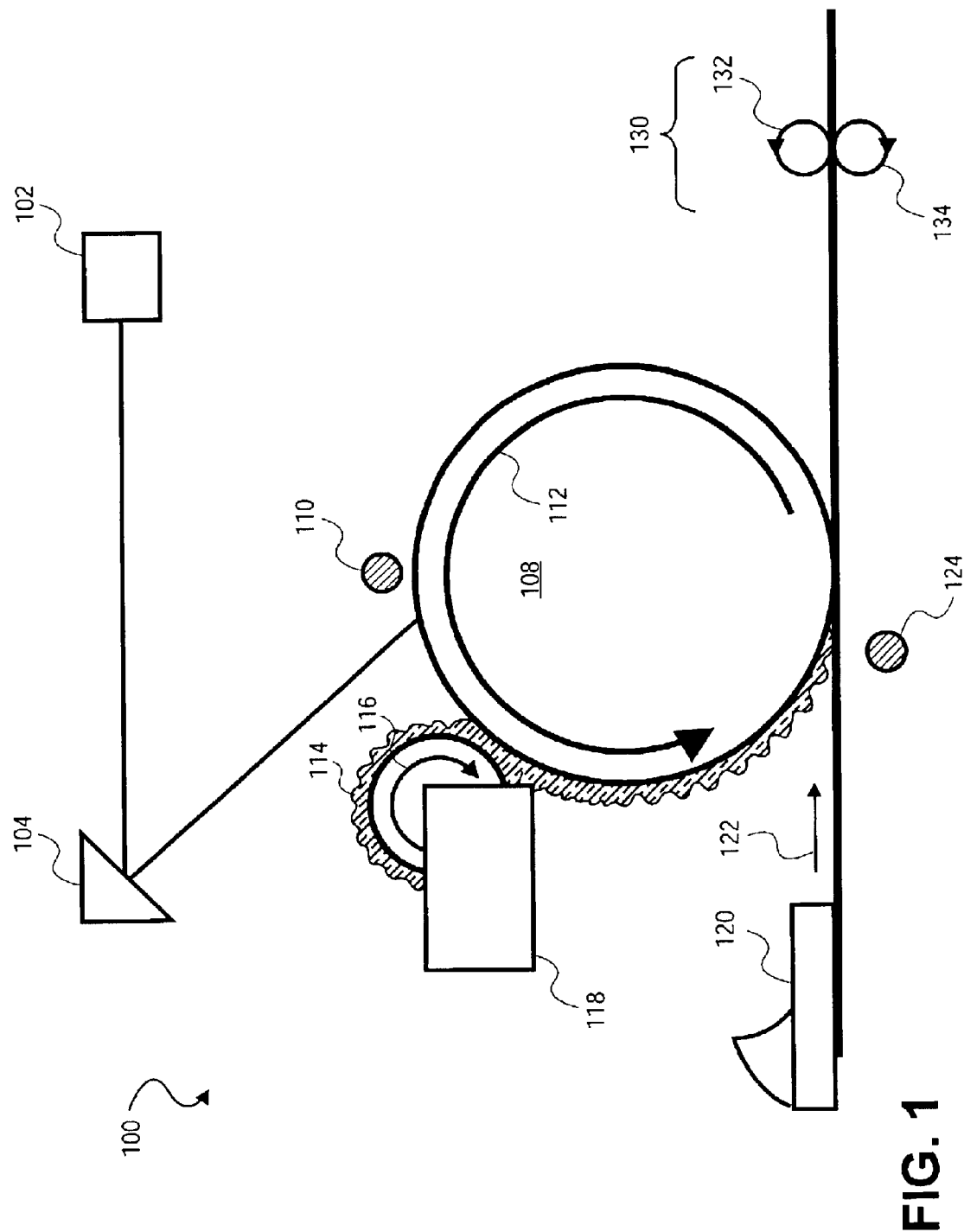
FIG. 1 is a diagram of an example laser printer, in conjunction with which embodiments of the invention may be implemented.

FIG. 1 shows an example laser printer 100 in accordance with which embodiments of the invention can be implemented. The laser printer 100 is more generally a laser-printing device, and most generally an image-formation device that forms images on media. A photoreceptor drum 108 is made from a photoconductive material that is discharged by light photons. Initially, the drum 108 is given a total charge via a charged corona wire 110, which is a wire with an electrical current running through it. Alternatively, a charged roller can be used instead of the corona wire 110. As the drum 108 revolves, the printer 100 shines a laser beam emanating from the laser beam light source 102, and reflected by the reflector 104, onto the surface of the drum 108 to discharge certain points in accordance with a print job. In this way, the laser draws, or scans, the print job to be printed as a pattern of electrical charges, which can be referred to as an electrostatic image. The drum rotates counter-clockwise for purposes of illustration only, as indicated by the arrow 112.

After the pattern has been set, the printer 100 coats the drum 108 with charged toner, which is typically fine powder. In monochrome printers, black toner is used; in color printers, three primary colors are typically used, which may be applied to the drum sequentially, or there may be a drum for each color. The toner also has a charge, so the toner clings to the discharged areas of the drum 108, but not to the charged background. The toner is dispensed by a developer roller 114 that rotates in either clockwise or counter-clockwise direction against the drum 108, after having rotated through the toner hopper 118 to pick up toner. For purposes of illustration only, the arrow 116 indicates a clockwise direction of rotation for the roller 114. With the powder pattern affixed, the drum 108 rolls over a sheet of media 120, which moves in the direction indicated by the arrow 122. Before the media 120 rolls under the drum 108, it is given a charge by the transfer corona wire 124 or by a charged roller. This charge is stronger than the charge holding the toner to the drum 108 so the media 120 pulls the powder away from the drum 108.

The printer 100 finally passes the media 120 through the fuser 130, which in the printer 100 specifically is a pair of heated rollers 132 and 134 that move in opposite direction. Alternatively, only one of the rollers 132 and 134 is heated. As the media 120 passes through these rollers 132 and 134, the loose toner powder melts, and flows onto the surface of the media 120. The fuser 130 rolls the media 120 to an output tray, providing a printed image. The fuser also heats up the media 120 itself, such that the media 120 is warm when it leaves the printer 100. After depositing the toner on the media 120, the drum 108 passes a cleaning station (not shown in FIG. 1), which cleans the surface of the drum 108 and prepares it for repeating the process.

Figure 2:
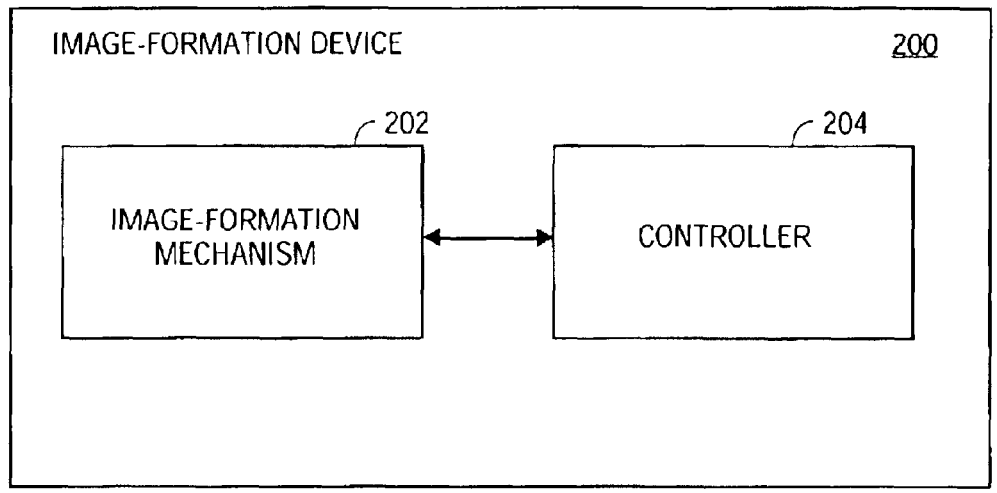
FIG. 2 is a block diagram of an example image-formation device, in conjunction with which embodiments of the invention may be implemented.

FIG. 2 shows a block diagram of a more general image-formation device 200, in conjunction with which embodiments of the invention can be implemented. The image-formation device 200 may be a laser-printing device, such as the laser printer 100 of FIG. 1, or another printing device known in the art. The image-formation device 200 includes an image-formation mechanism 202 operably coupled to a controller 204. The image-formation mechanism 202 is capable of forming images on media. For example, the image-formation mechanism 202 may be a laser-printing mechanism, inclusive of the components of the laser printer 100 depicted and described in conjunction with FIG. 1. The controller 204 controls the formation of images on media by the image-formation mechanism 202. The controller 204 may be hardware, software, or a combination of hardware and software. For instance, the controller 204 may include a processor, firmware, and/or memory, among other types of hardware and/or software components.

Dynamically Determining First-page Out (FPO) Time

Figure 3:
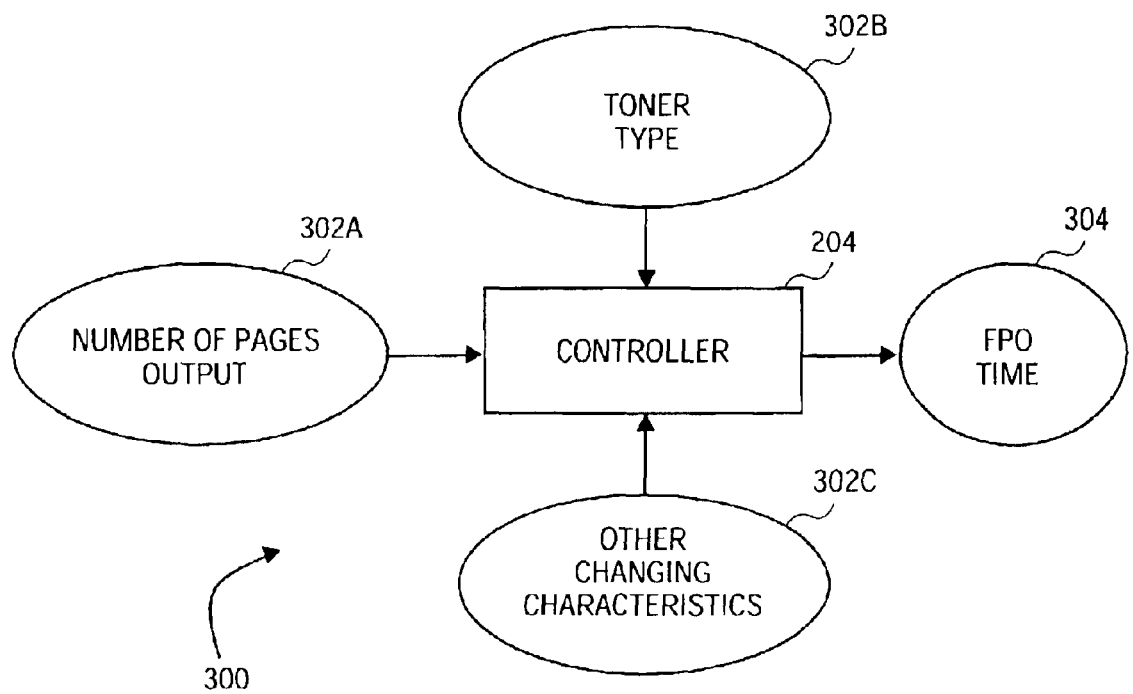
FIG. 3 is a diagram depicting how the first-page out (FPO) time of an image-formation mechanism can be dynamically determined based on changing characteristics of the mechanism, according to an embodiment of the invention.

FIG. 3 shows a diagram 300 that depicts how the controller 204 of the image-formation device 200 of FIG. 2 can dynamically determine the first-page out (FPO) time 304 for the image-formation device 200, according to an embodiment of the invention. More specifically, the diagram 300 depicts how the controller 204 can dynamically determine the FPO time 304 for the image-formation mechanism 202 of the device 200. The controller 204 may determine the FPO time 304 based on the total number of pages output 302A onto media by the image-formation device 200, the toner type 302B currently being employed, as well as other changing characteristics 302C. The determination of the FPO time 304 by the controller 204 is dynamic in that as the total number of pages output 302A, the toner type 302B, and/or the other characteristics 302C change, the controller 204 updates or redetermines the FPO time 304.

The number of pages output 302A onto media is the number of pages of media on which images have been formed by the image-formation mechanism 202 of the image-formation device 200. The number of pages output 302A is an indicator of the life of the image-formation mechanism 202. As the number of pages output 302A increases, it may take longer for the image-formation mechanism 202 to output the first page. Therefore, the controller 204 may increase the FPO time 304 as the number of pages output 302A increases, on a linear or other basis.

The toner type 302B is the type of toner that is currently being used by the image-formation mechanism 202 of the image-formation device 200 to form images onto media. Toner may have different melting and other characteristics that affect the FPO time 304. A soft or low melting-point toner, for instance, may need a shorter FPO time 304 than a hard or high melting-pointing toner does. Therefore, the controller 204 may increase or decrease the FPO time 304 depending on the toner type 302B. This may be accomplished with a look-up table (LUT), a multiplier or offset by which to adjust the FPO time 304, or other information stored in or made available to the controller 204. Information may, for example, be stored in a memory tag integral with the toner cartridge, as discussed below.

Figure 4:
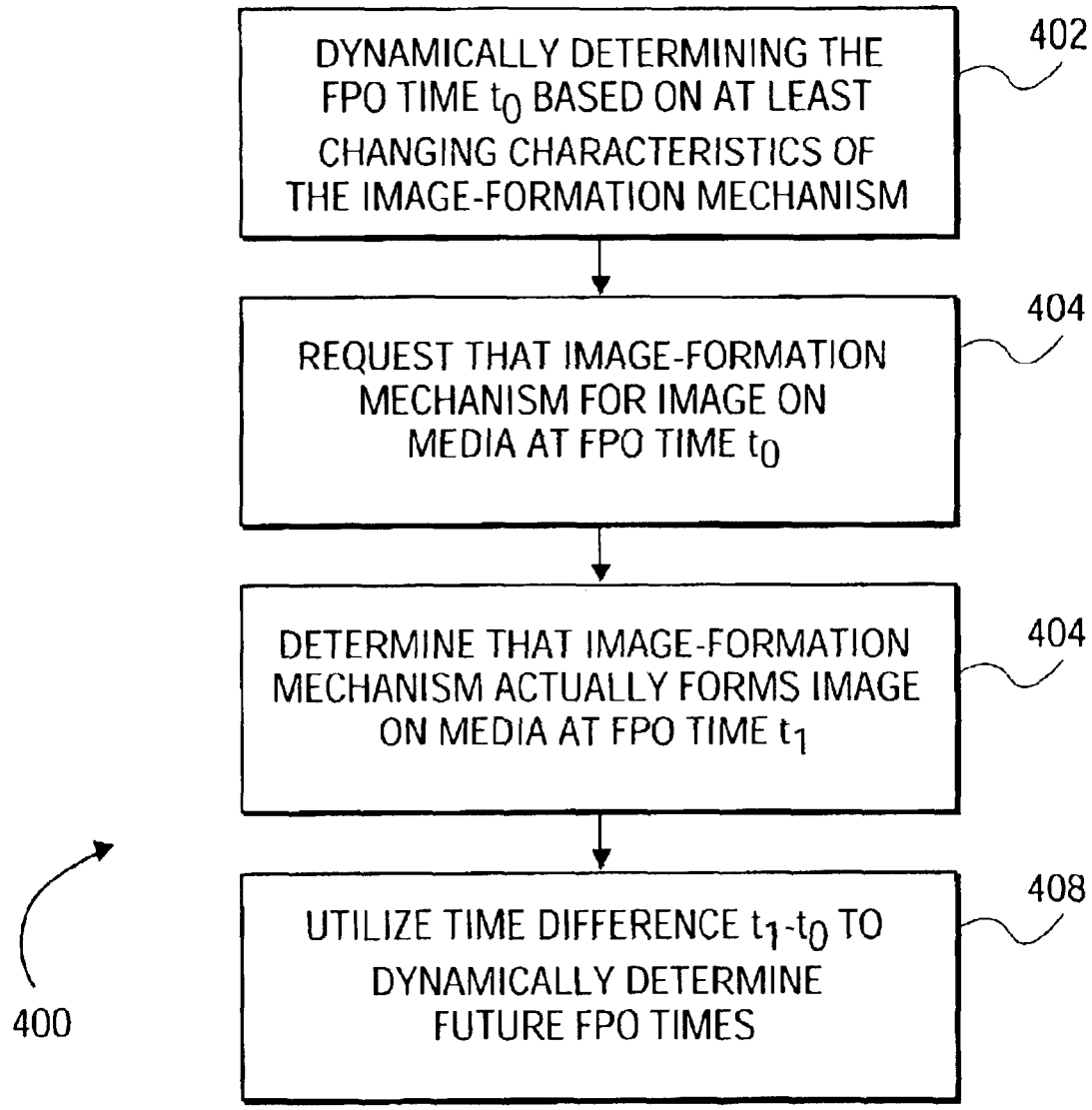
FIG. 4 is a flowchart of a method for dynamically determining the FPO time of an image-formation mechanism, according to an embodiment of the invention.

The other changing characteristics 302C may include the actual FPO time needed by the image-formation device 200, as opposed to the FPO time 304 determined by the controller 204. This is particularly described for one embodiment of the invention in conjunction with the method 400 of FIG. 4. The controller 204 initially determines the FPO time 304 as time $t_0$, based on the changing characteristics of the image-formation mechanism 202 (402). For instance, the controller 204 may initially determine the FPO time 304 based on the number of pages output 302A and the toner type 302B. The other changing characteristics 302C may also include media type, environmental factors, and so on, as can be appreciated by those of ordinary skill within the art.

Next, the controller 204 requests that the image-formation mechanism 202 output the first page of media at the FPO time 304, as the time $t_0$ (404), but monitors, or determines, that the image-formation mechanism 202 actually outputs the first page of media at time $t_1$ greater than (or less than) the time $t_0$ (406). This may be due to operating, environmental, and other conditions not taken into account by the controller 204 in determining the FPO time 304 in 402. The controller 204 may thus increase the FPO time 304 in the future to take into account, or otherwise utilize, the time difference $t_1$ minus $t_0$, so that a later-determined and requested FPO time 304 more accurately reflects the actual FPO time needed by the image-formation mechanism 202 (408).

For example, the controller 204 may determine and request another FPO time 304, as the time $t_2$. The time $t_2$ is again based on number of pages output 302A and the toner type 302B. However, the time $t_2$ also has added thereto the time difference $t_1$ minus $t_0$. The controller 204 thus utilizes the time difference $t_1$ minus $t_0$ in determining the time $t_2$, so that the FPO time 304 more accurately reflects the time needed by the image-formation mechanism 202 before outputting its first page.

Image-formation Device and Controller Assembly

Figure 5:
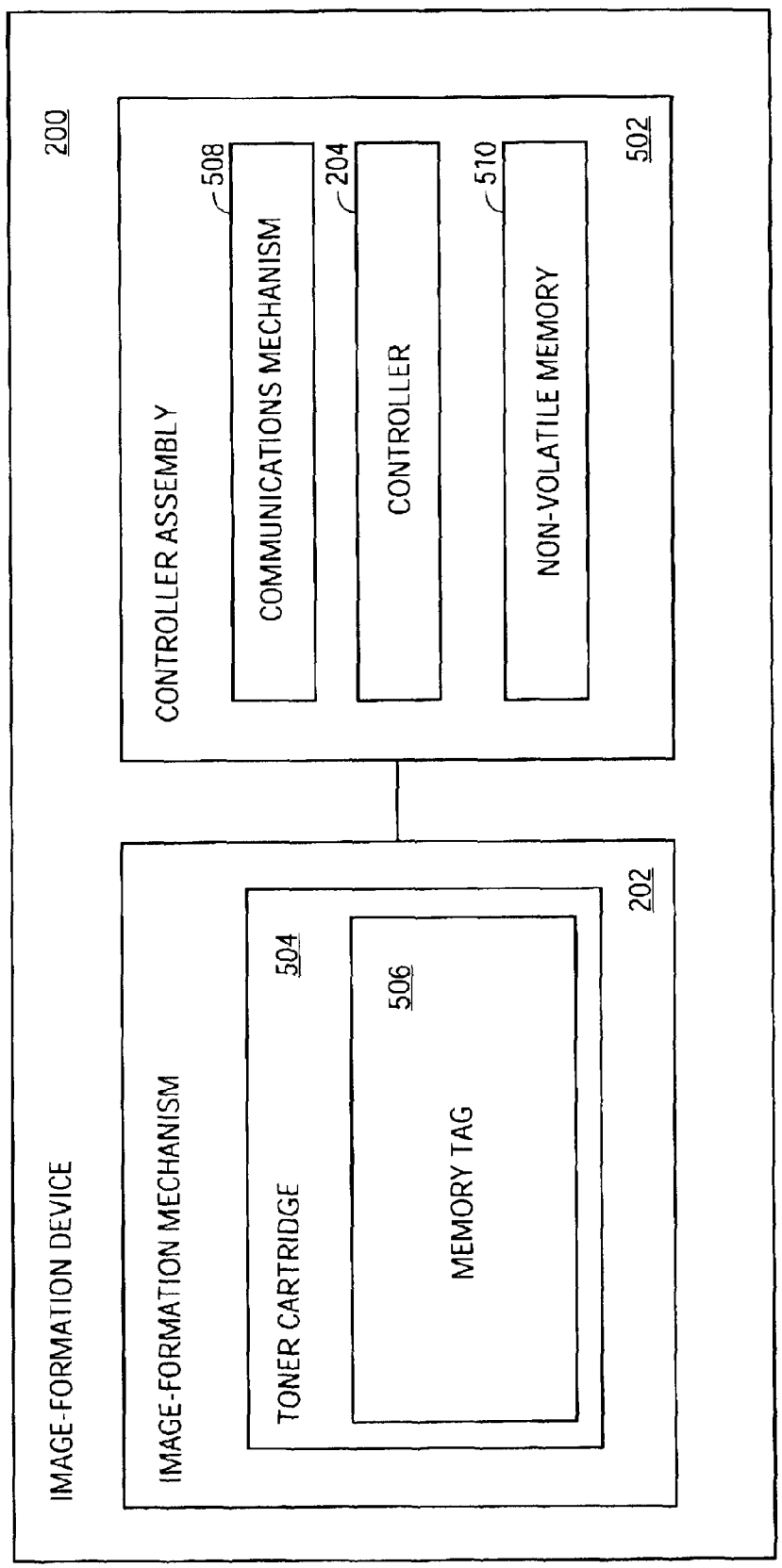
FIG. 5 is a block diagram of an image-formation device, according to an embodiment of the invention.

FIG. 5 shows the image-formation device 200, according to an embodiment of the invention. The image-formation device 200 includes the image-formation mechanism 202, as well as a controller assembly 502. The image-formation mechanism 202 is receptive to a toner cartridge 504 that stores toner for use by the image-formation mechanism 202, and that has a memory tag 506. The memory tag 506 is a non-volatile memory, such as a flash memory, that has stored thereon the toner type 302B, or other information relevant to the first page out determination.

The controller assembly 502 includes a communications mechanism 508, the controller 204, and a non-volatile memory 510. The communications mechanism 508 enables the controller 204 to receive information from and send information to the image-formation mechanism 202, including the memory tag 506 of the toner cartridge 504 inserted into the image-formation mechanism 202. For instance, the controller 204 may receive the toner type 302B through the communications mechanism 508 from the memory tag 506 of the toner cartridge 504. The communication mechanism 508 may be or include one or more interface buses, connectors, plugs, or other types of communication mechanisms.

The non-volatile memory 510 is used to store the number of pages output 302A onto by the image-formation mechanism 202. The non-volatile memory 510 may also be used to store the other changing characteristics 302C. The non-volatile memory 510 may be or include a semiconductor memory, such as flash memory, a magnetic memory, such as a hard disk drive, and/or another type of memory. In one embodiment, the non-volatile memory 510 is part of the controller 204.

The controller 204 thus dynamically determines the first-page out (FPO) time for the image-formation mechanism 202 based on the number of pages output 302A stored in the non-volatile memory 510, on the toner type 302B stored in the memory tag 506, and/or on the other changing characteristics 302C that may be stored in the memory 510. The controller 204 may mirror the information stored in the memory tag 506 to the non-volatile memory 510, and vice-versa. That is, the controller 204: may redundantly store the number of pages output 302A and the other changing characteristics 302C in the memory tag 506, and may redundantly store the toner type 302B in the memory 510.

The controller 204 tracks the number of pages output by the image-formation mechanism 202 onto media, and updates the number of pages output 302A stored in the non-volatile memory 510 and/or in the memory tag 506. The controller 204 also monitors the actual FPO time of the image-formation mechanism 202. This is accomplished to update the changing characteristics 302C as the time difference between the actual FPO time and the FPO time determined and requested by the controller 204, as has been described in the previous section of the detailed description.

Conclusion

It is noted that, although specific embodiments have been illustrated and described herein, it will be appreciated by those of ordinary skill in the art that any arrangement is calculated to achieve the same purpose may be substituted for the specific embodiments shown. Whereas some embodiments of the invention have been described in relation to image-formation mechanisms that are laser-printing mechanisms, other embodiments of the invention itself are not so limited. For instance, other embodiments of the invention can also be applied to color printers as well as black-and-white printers, such as color laser printers, and so on. As another example, whereas some embodiments of the invention have been substantially described in relation to image-formation devices that are printers, other embodiments are applicable to other sorts of devices, such as electro-photographic photocopying machines, fax machines, and so on. This application is thus intended to cover any adaptations or variations of the present invention. Therefore, it is manifestly intended that this invention be limited only by the claims and equivalents thereof.

We claim:

1. An image-formation device comprising:
   an image-formation mechanism capable of forming images on media; and,
   a controller capable of dynamically determining a first-page out (FPO) time for the image-formation mechanism based on at least changing characteristics of the image-formation mechanism,
   wherein the FPO time for the image-formation mechanism indicates how long it takes for the image-formation mechanism to complete and eject a first media sheet of an image-formation job on which an image has been formed after the image-formation device has received the job, the FPO time depending at least on a length of time it takes for the image-formation mechanism to become ready to form images on media.

2. The image-formation device of claim 1, wherein the changing characteristics of the image-formation mechanism comprise a number of pages of media on which images have been formed by the image-formation mechanism.

3. The image-formation device of claim 2, wherein the controller is capable of tracking the number of pages of media on which images have been formed by the image-formation mechanism.

4. The image-formation device of claim 2, further comprising a non-volatile memory on which the number of pages of media on which images have been formed by the image-formation mechanism is stored and updated.

5. The image-formation device of claim 4, wherein the non-volatile memory is part of the controller.

6. The image-formation device of claim 1, wherein the image-formation mechanism is a laser-printing mechanism, and the controller is capable of dynamically determining the FPO time for the image-formation mechanism based on a toner type utilized by the laser-printing mechanism.

7. The image-formation device of claim 6, wherein the image-formation mechanism is receptive to a toner cartridge having a memory tag on which the toner type thereof is indicated.

8. The image-formation device of claim 1, wherein the controller further monitors an actual FPO time for the image-formation mechanism and utilizes a time difference between the actual FPO time and the FPO time determined to determine future FPO times for the image-formation mechanism.

9. The image-formation device of claim 1, wherein the image-formation device is a laser-printing device.

10. An image-formation device comprising:
    an image-formation mechanism capable of forming images on media; and,
    means for dynamically determining a first-page out (FPO) time for the image-formation mechanism based on at least changing characteristics of the image-formation mechanism,
    the changing characteristics comprising at least one of a number of pages of media on which images have already been formed by the image-formation mechanism, a type of toner currently being employed by the image-formation mechanism an actual FPO time for the image-formation mechanism, a type of media on which images are to be formed by the image-formation mechanism and environmental factors.

11. The image-formation device of claim 10, wherein the changing characteristics of the image-formation mechanism comprise a number of pages of media on which images have been formed by the image-formation mechanism.

12. The image-formation device of claim 10, wherein the image-formation mechanism is a laser-printing mechanism, the means dynamically determining the FPO time for the image-formation mechanism based on a the toner type utilized by the laser-printing mechanism.

13. The image-formation device of claim 10, wherein the means is further for monitoring an actual FPO time for the image-formation mechanism and utilizes a time difference between the actual FPO time and the FPO time determined to determine future FPO times for the image-formation mechanism.

14. The image-formation device of claim 10, wherein the image-formation device is a laser-printing device.

15. A method comprising:

requesting that an image-formation mechanism font an image on media at a first-page out (FPO) time t0;

determining that the image-formation mechanism actually forms the image on the media at a FPO time t1; and, utilizing a time-difference t1–t0 to dynamically determine future FPO times.

16. The method of claim 15, further initially comprising dynamically determining the FPO time t0 based on at least changing characteristics of the image-formation mechanism.

17. The method of claim 16, wherein dynamically determining the FPO time t0 based on at least the changing characteristics of the image-formation mechanism comprises determining the FPO time t0 based on at least a number of pages of media on which images have been formed by the image-formation mechanism.

18. The method of claim 16, wherein dynamically determining the FPO time t0 based on at least the changing characteristics of the image-formation mechanism comprises determining the FPO time t0 further based on a toner type utilized by the image-formation mechanism, the image-formation mechanism being a laser-printing mechanism.

19. The method of claim 15, wherein utilizing the time-difference t1–t0 to dynamically determine the future EPO times comprises dynamically determining a FPO time t2 based on at least changing characteristics of the image-formation mechanism, and plus the time-difference t1–t0.

20. A controller assembly for a laser-printing mechanism of a laser-printing device comprising:

a non-volatile memory on which a number of pages of media on which the laser-printing mechanism has printed is stored and updated;

a communications mechanism to receive from a toner cartridge inserted into the laser-printing mechanism a toner type of toner stored within the toner cartridge; and, a controller to dynamically determine a first-page out (FPO) time for the laser-printing mechanism based on the number of pages of media on which the laser-printing mechanism has printed and on the toner type of the toner stored within the toner cartridge.

21. The controller assembly of claim 20, wherein the controller further is to monitor an actual FPO time for the laser-printing mechanism and determine future FPO times for the laser-printing mechanism also based on a time difference between the actual FPO time and the FPO time determined.

22. A toner cartridge for use within a laser-printing device, the laser-printing device capable of dynamically determining a first-page out (FPO) time for a laser-printing mechanism of the laser-printing device based on at least changing characteristics of the laser-printing mechanism including a toner type of toner, the toner cartridge comprising:

a supply of toner; and, a memory device having stored thereon at least the toner type of the toner within the supply of toner, for utilization by the laser-printing device in dynamically determining the FPO time for the laser-printing mechanism of the laser-printing device.

23. The toner cartridge of claim 22, wherein the memory device is a memory tag.

24. The toner cartridge of claim 22, wherein the memory device is receptive to storing the changing characteristics of the laser-printing mechanism from the laser-printing device, other than the toner type of the toner, as received from the laser-printing device.

25. The toner cartridge of claim 24, wherein the changing characteristics that the memory device is receptive to storing include a number of pages output by the laser-printing mechanism.

* * * * *

UNITED STATES PATENT AND TRADEMARK OFFICE
CERTIFICATE OF CORRECTION

PATENT NO. : 6,788,903 B1
DATED : September 7, 2004
INVENTOR(S) : Mayer et al.

It is certified that error appears in the above-identified patent and that said Letters Patent is hereby corrected as shown below:

Column 6,
Line 51, delete "of" and insert therefor -- of: --.
Lines 55 and 58, delete "mechanism" and insert therefor -- mechanism, --.
Line 61, delete "a" and insert therefor -- the --.
Line 66, after "on", delete "a".

Column 7,
Line 10, delete "font" and insert therefor -- form --.

Signed and Sealed this

Nineteenth Day of April, 2005

JON W. DUDAS
*Director of the United States Patent and Trademark Office*